United States Patent
Carter et al.

[15] 3,668,766
[45] June 13, 1972

[54] PIPE COUPLING DEVICE

[72] Inventors: J. Warne Carter, Wichita Falls; Martin Duane Neher, Burkburnett, both of Tex.

[73] Assignee: Ciba-Geigy Corporation, Ardsley, N.Y.

[22] Filed: Nov. 27, 1970

[21] Appl. No.: 92,996

[52] U.S. Cl. ..............................29/237, 254/29 R, 269/37
[51] Int. Cl. .....................................................B23p 19/04
[58] Field of Search..................29/237, 244, 267; 254/29 R; 269/37

[56] References Cited

UNITED STATES PATENTS 1,627,288   5/1927   Kurkowski...............................269/37
1,894,835   1/1933   Smith et al...............................269/37

Primary Examiner—Andrew R. Juhasz
Assistant Examiner—Michael Koczo, Jr.
Attorney—Harry Goldsmith, Joseph G. Kolodny and Mario A. Monaco

[57] ABSTRACT

A pipe coupling device is provided which comprises a pair of parallel, telescopically arranged frames. Each frame is provided with means for holding or clamping a pipe section. The frames are connected to one another by tension springs. Manually operable means is employed to place the springs in tension so that the joint provided by the mating ends of pipe sections coated with a cement has constant, resilient pressure applied thereto.

9 Claims, 7 Drawing Figures

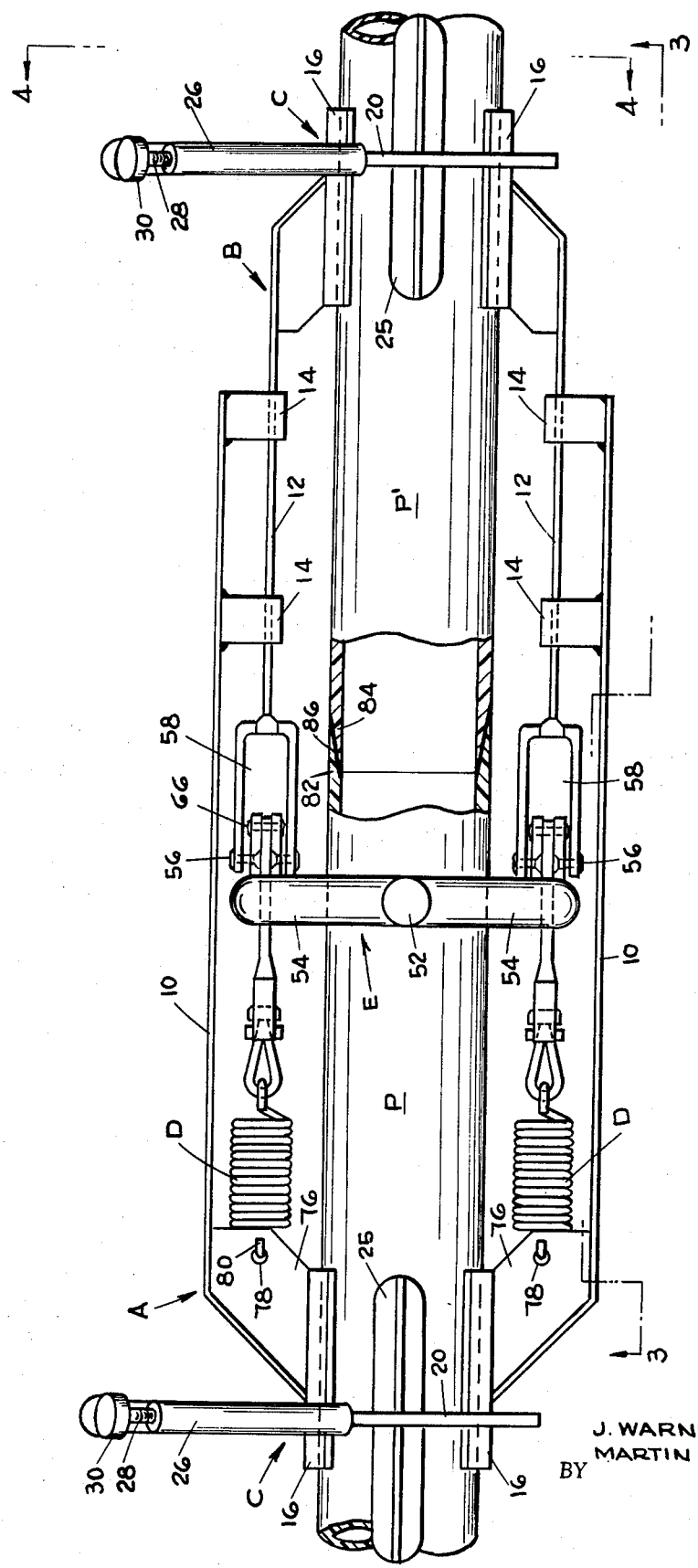

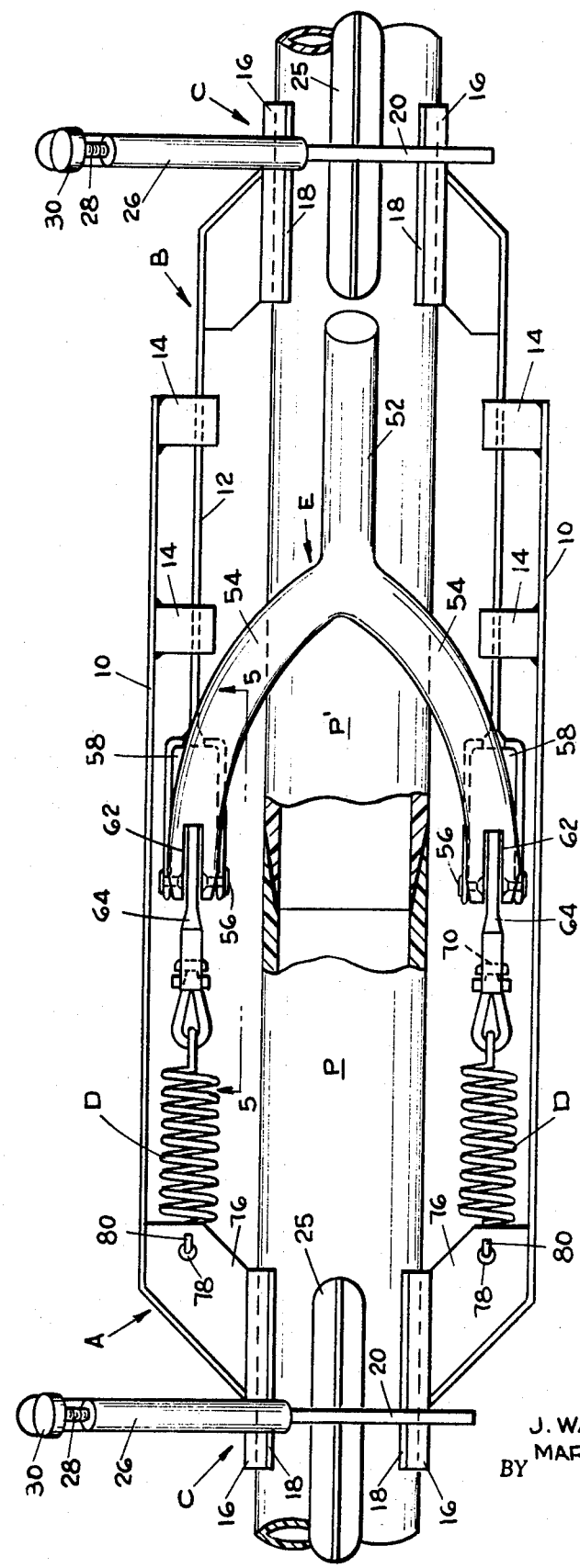

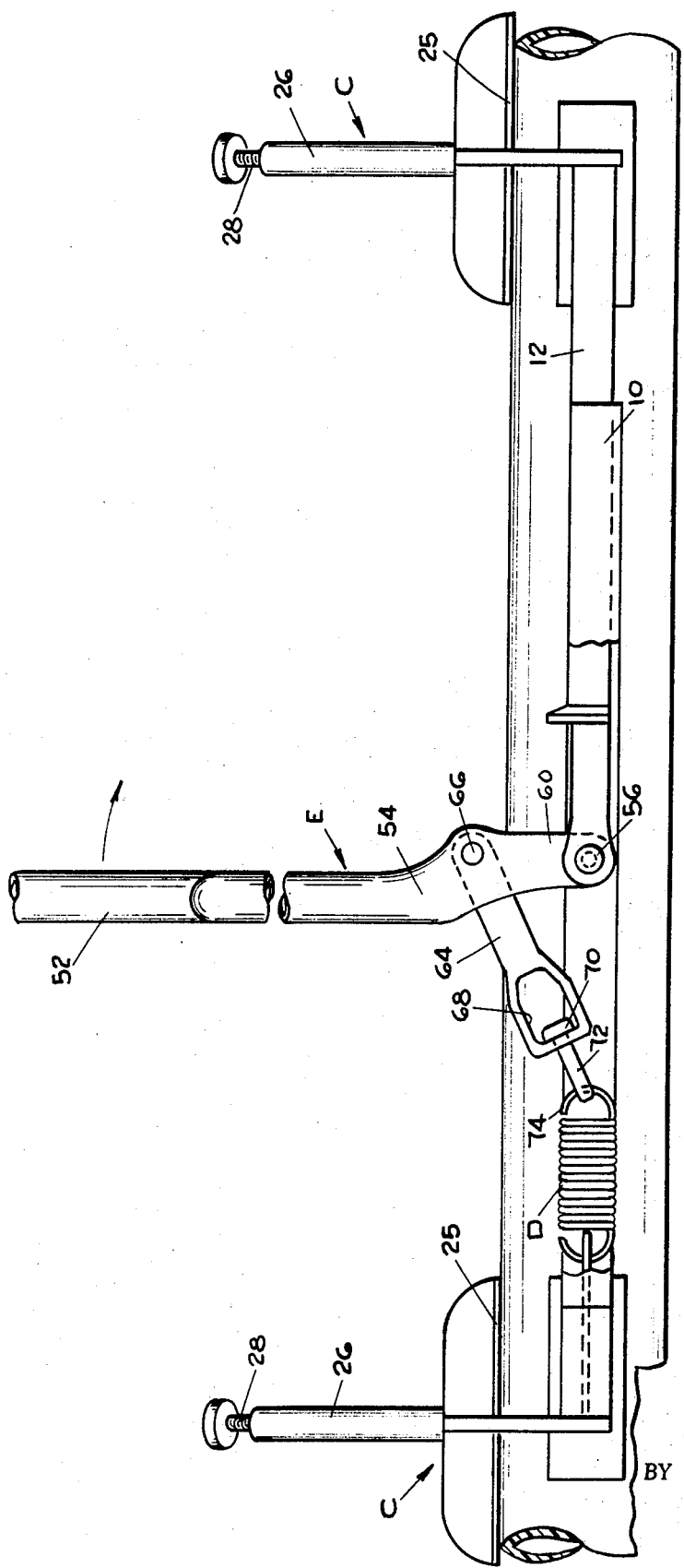

INVENTORS
J. WARNE CARTER AND
MARTIN DUANE NEHER
BY

ATTORNEY

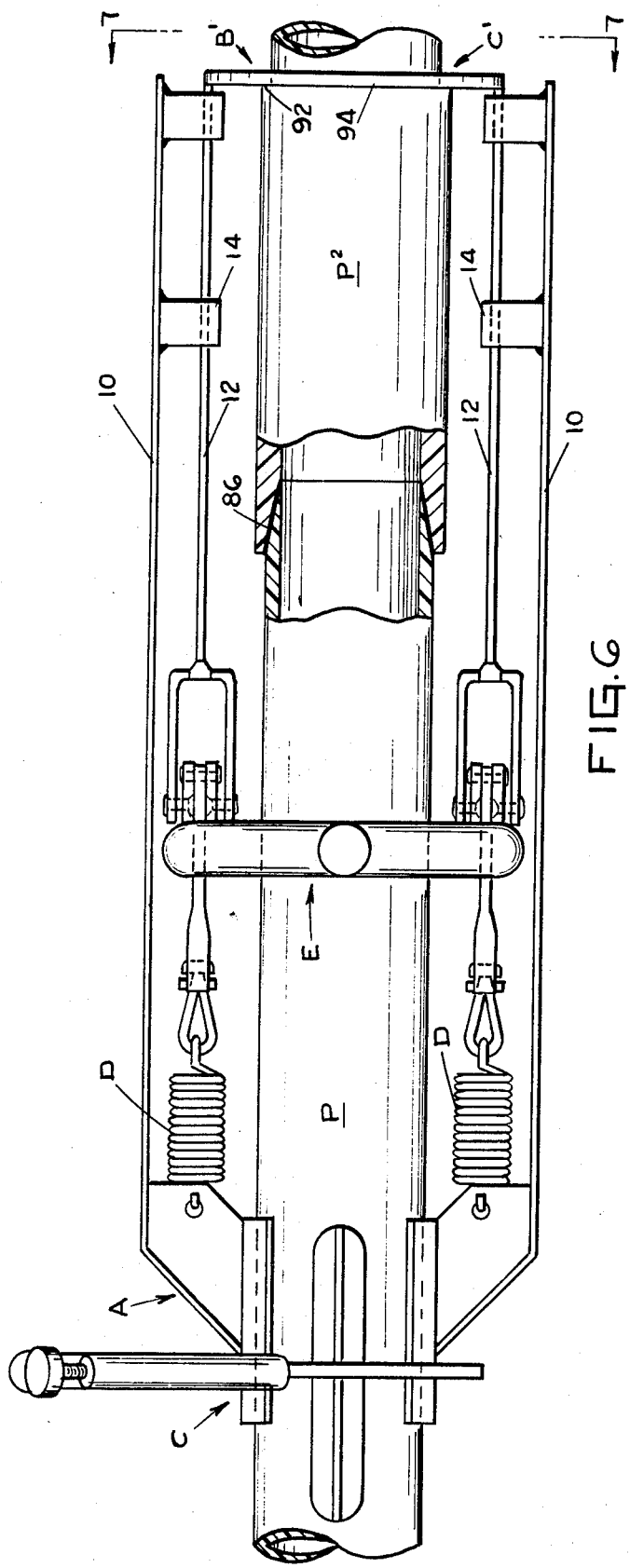
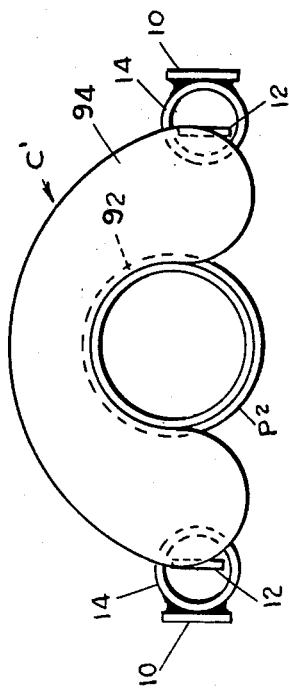

PIPE COUPLING DEVICE

The invention relates to improvements in pipe coupling devices, or devices for joining the ends of sections of pipe with an adhesive or cement.

BACKGROUND OF THE INVENTION

There is presently on the market pipe made of glass fibers coated and embedded in a suitable resin, such as an epoxy resin or a polyester resin. In installing pipe lines in the field, it is the practice to join sections of predetermined lengths of pipe by bonding an externally tapered pipe end within an internally tapered socket end by a thermosetting resin cement or adhesive at the adjoining or mating tapered portions of the pipe sections. Instead of joining two pipe lengths, it is often necessary to join a collar or an elbow section to a pipe section. The joint is the same as when connecting two pipe sections of predetermined linear length. The term "pipe section" as hereinafter used in the specification and claims is intended to refer to a pipe section having a predetermined linear length, or a pipe fitting such as an elbow or a collar having a portion of sufficient linear length which may be held or clamped in the device of the invention.

In any event, it is essential that the joint be as immobile as possible during the period that the thermosetting resin cement is being cured. Any movement of the pipe sections which may occur after the thermosetting resin begins to cure, and before complete curing, causes damage to the joint, which cannot be detected by any means other than pressure testing of the joined pipe sections.

The primary object of the invention is to provide a device for joining the ends of pipe sections wherein the device is constructed to maintain the sections to be joined in a manner to assure the complete curing of a thermosetting cement at the joint, while maintaining the parts to be joined in substantially immobile condition.

Another object of the invention is to provide a pipe coupling device which, while the cement is undergoing curing, affords the application of constant, resilient pressure to the joint so that any relative movement between pipe sections which may occur will actually tend to make the tapered ends being joined fit more tightly and securely to one another.

These, and other objects and advantages of the invention will be apparent from the description which follows.

BRIEF DESCRIPTION OF THE INVENTION

A pipe coupling device made in accordance with the invention comprises an outside frame having laterally spaced, longitudinally extending bar portions. A second or inside frame having laterally spaced, longitudinally extending bar portions is related to the first frame so that its bar portions are positioned adjacent to and inwardly of the outside bar portions. The inside frame bar portions are spaced apart a distance to allow pipe to extend longitudinally therebetween. Means is provided by the bar portions of one frame for cooperation with the bar portions of the other frame to maintain the frames in parallel, telescopic alignment. Each frame is provided with means for holding a pipe section. The device includes a pair of laterally spaced tension springs. Each spring has one end connected to the inner end of each bar portion of one frame and its opposite end connected to the other frame. Manually operable means is provided to place the springs in tension, whereby the joint of the matingly tapered ends of pipe sections having a cement applied thereto has constant, resilient pressure applied thereto for the formation of the finished joint. In the operative position of the device, the tension springs are parallel to or lie in substantially the same plane as the plane of the frames' bar portions.

BRIEF DESCRIPTION OF THE DRAWINGS

The invention will be further described with reference to the accompanying drawings, which illustrate preferred embodiments of the invention, in which:

FIG. 1 is a top plan view of one embodiment of the invention, this view showing the device in open position;

FIG. 2 is a top plan view of the device shown in FIG. 1, this view however showing the device in its closed or operative position;

FIG. 3 is a side elevational view, partly broken away, taken approximately in the planes of line 3—3 of FIG. 1;

FIG. 6 is a top plan view of another embodiment of the invention, this view showing the device in open position; and FIG. 7 is an end elevational view taken approximately in the plane of line 7—7 of FIG. 6.

DETAILED DESCRIPTION OF THE INVENTION

Referring to FIGS. 1-5, the pipe coupling device of the invention comprises an outside frame A and an inside frame B. The frames are made of a heavy gauge metal such as steel. The outside frame A is formed to provide laterally spaced, longitudinally extending bar portions 10. The inside frame B is formed to provide laterally spaced, longitudinally spaced bar portions 12. The bar portions 12 are positioned adjacent to and inwardly of the outside frame bar portions 10. The inside frame bar portions are laterally spaced apart a distance sufficient to allow pipe to extend longitudinally therebetween. Means is provided by the bar portions of one frame for cooperation with the bar portions of the other frame to maintain the frames in parallel, telescopic alignment. For this purpose, and as illustrated, the bar portions of the outer frame are provided with guide rings 14 secured thereto as by welding. The bar portions 12 of the inside frame extend through the guide rings. The guiding arrangement may be reversed; that is, the guide rings may be provided to extend from the inside frame bar portions 12, whereupon the outside frame bar portions 10 extend through the guide rings.

Means C is associated with each frame for holding a pipe section. In the embodiment of the invention illustrated in FIGS. 1-5, the pipe section holding means associated with each frame is the same and comprises adjustable clamping means. The description of the pipe section clamping means provided on one frame is equally applicable to the pipe section clamping means on the other frame.

Figure 4:
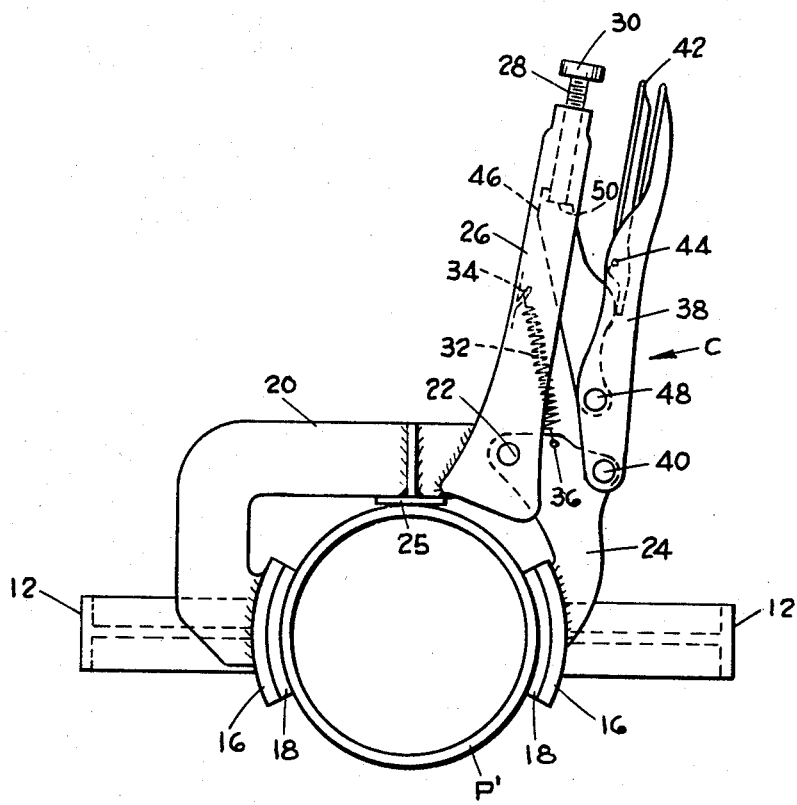
FIG. 4 is an end elevational view taken in approximately in the plane of line 4—4 of FIG. 1.

As shown in FIGS. 1-4, opposed clamping jaws 16 are respectively mounted on each frame at its outer end. Each jaw is lined with a friction-type cushioning material 18 such as rubber so that pipe sections P and P' having their ends suitably prepared may be clamped and gripped without scoring or damaging the surfaces of the pipe sections. As shown in FIG. 4, each frame has a bridging yoke 20 extending across and above the opening between the opposed jaws 16, and the jaws are made adjustable to accommodate pipe sections having a diameter slightly smaller or larger than standard. The yoke 20 is fixed to one side of a frame as by welding, and is pivotally connected by a pin 22 to an upstanding ear 24 secured as by welding to the opposite side of the frame. By such arrangement, one side of each frame may rotate to a limited extent with respect to its respective opposite side. The yoke 20 has a central, longitudinally extending bracket 25 fixed thereto to engage and aid in positioning the device upon the pipe sections to be joined.

As best shown in FIG. 4, the adjustability of the clamping jaws 16 with respect to each other is accomplished by providing an upstanding hand clamp member 26 fixedly secured to the yoke 20 as by welding. An adjusting screw 28 having a knurled outer end 30 is threaded into the hand clamp member 26. A coiled tension spring 32 has one end hooked at 34 to the fixed clamp member and its other end hooked through an opening 36 in the ear 24. The geometry is such that the spring tends to pull the jaws 16 apart about the pivot 22. A lever 38 is pivotally connected at 40 to the ear 24. A second lever 42 is positioned within and pivotally connected at 44 to the lever 38. An intermediate link 46 is pivoted at 48 to the lever 38 and its opposite end 50 is positioned under the end of the screw 28. The coiled tension spring 32 acts to maintain the end 50 of the link 48 against the end of the screw 28. The described mechanism is a modification of a device sold commercially under the trademark "Vise-Grip."

With the above described arrangement, turning the screw 28 clockwise or counter-clockwise serves to decrease or increase the distance between the clamping jaws 16. The degree of tension in the clamp also is controlled by the described mechanism. After the clamping jaws 16 have been adjusted to the desired spacing, clamping is accomplished by pressing together the lever 38 and the fixed hand clamp member 26. To release the clamping jaws, the levers 38 and 42 are pressed together. While the above described adjustable clamping means is preferred, any suitable clamping means may be associated with each frame to clamp or hold pipe sections for their connection to one another.

The frames A and B are connected to one another by a pair of coiled tension springs D, and as hereinafter described these springs, which are symmetrically arranged within the device, serve to impart a constant, resilient pressure to the mating ends of the pipe sections which are joined by a suitable cement.

As shown in FIGS. 1, 2 and 3, each spring D has one end connected to the inner end of each bar portion 12 of the inside frame B and its opposite end connected to the outside frame A. Manually operable means E is associated with the frame members A and B and related to the springs D to place the springs in tension in the operative or closed position of the device.

Figure 5:
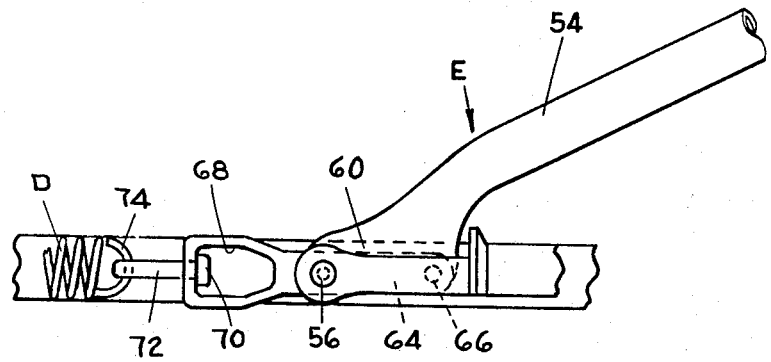
FIG. 5 is a partial, side elevational view taken approximately in the plane of line 5—5 of FIG. 2.

In greater detail, the manually operable means E comprises a bifurcated lever having a central hand gripping portion 52 and laterally spaced arms 54 respectively pivotally connected at 56 to the inner end of each bar portion 12 of the inside frame B. As best shown in FIGS. 1 and 2, the inner end of each bar portion 12 is formed with an open ended slot 58 to receive therebetween the end of each arm 54 and to allow the lower portion 60 of each arm to be received within the slot when the lever is rotated to operative position, as shown in FIGS. 2 and 5. The lower end of each arm 54 also is slotted at 62 to allow a portion of a toggle link 64 to be received in such slot. One end of each toggle link is pivotally connected at 66 to a respective arm 54 in spaced relation or above the pivotal connection 56 of each arm to the inner end of each bar portion 12 of the frame B. The opposite end of each toggle link is connected to one end of each spring D. As illustrated, each toggle link 64 may be formed with an eye 68 to receive the headed end 70 of another eye member 72. The end 74 of the spring is bent and extended through the eye member 72 for connection thereto. The opposite end of each tension spring D is connected to the frame A in any suitable manner.

Preferably, and as shown in FIGS. 1 and 2, the frame A is provided with integrally formed, laterally spaced web portions 76 near the end which has the clamping means C mounted thereon. Each web portion is provided with an aperture 78 through which the end 80 of each spring is hooked and thereby connected to the frame A. As will be apparent from a viewing of FIGS. 1 and 2, the springs D are symmetrically arranged in that there is one spring on each side, in alignment with the bar portions 12, and equally spaced from the central longitudinal axis of the device.

The pipe sections P and P' have their ends prepared for their connection to each other. As shown in FIG. 1, the pipe section P has its end chamfered to furnish an internal taper 82, and the pipe section P' is chamfered to provide an external taper 84. A suitable cement 86, such as a thermosetting resin of the epoxy type, is applied to one or both of the tapered surfaces. To connect sections of pipe in the field, the cement coated ends of the pipe sections P and P' are pushed together as shown in FIG. 1. With the frames A and B displaced apart from one another, or with the manually operable means E in the up and open position as shown in FIGS. 1 and 3, the device is positioned over the pipe sections. The pipe coupling device is brought to a halt when the brackets 25 engage the pipe sections. Each pipe section is clamped by the clamping means C on each frame by pressing together the lever 38 and the fixed hand clamp member 26, as hereinbefore described. Any necessary adjustment for the particular diameter of each pipe section is accomplished by turning the threaded screws 28. The portion 52 of the bifurcated lever is grasped and rotated to the closed position, as shown in FIGS. 2 and 5. The device is allowed to remain in this position for a short period, or a few seconds. This action serves to take most of the slack out of the joint, and to evenly distribute the resin cement 86 because the tapered ends 82 and 84 of the pipe sections are mated under pressure.

The rotation of the bifurcated lever from the position shown in FIGS. 1 and 3 to the position shown in FIGS. 2 and 5 causes the pivoted toggle links 64 to assume positions in longitudinal alignment with the bar portions 12 and with the central longitudinal axis of each spring D. Tension is applied to the springs D because the end of each toggle link, or the location of its pivotal connection 66 to the bifurcated lever, is longitudinally displaced from the position shown in FIG. 3 to the position shown in FIG. 5.

For best results, the bifurcated lever is released or rotated back to the open position as shown in FIGS. 1 and 3. One of the clamping means C is released from the pipe section to which it has been secured. The clamping means is reclamped, following which the bifurcated lever is again rotated to the closed or operative position as shown in FIGS. 2 and 5. The tension upon the springs 8 acts to furnish resilient, constant pressure on the joint, or at the cemented tapered ends of the pipe sections. If any relative movement of the parts at the joint should occur, the resilient, constant pressure to which the pipe ends are subjected causes the tapered ends to fit even more tightly.

With three or four pipe coupling devices, as hereinbefore described, the operator in the field moves on to the next location down the line, performs the manipulative steps as above described with each device, and goes on to the location where the next joint is to be made and repeats the process. By the time the operator has made two or three more connections beyond the first one, the thermosetting resin cement 86 will have had time to cure so that the coupling device at such joint can then be removed and reused further up the line.

In the embodiment of the invention illustrated in FIGS. 6 and 7, the parts of the device which are identical with the parts hereinbefore described are given the same reference characters. In this embodiment, one of the frames, designated B', is constructed to support pipe section holding means C' for a pipe collar, designated $P^2$ having an external flange 92 extending around its outer periphery. For the connection of the collar $P^2$ to the pipe section P, the engaging ends are prepared with tapered ends and a cement 86 is applied to one or both of the tapered surfaces, as hereinbefore described. The pipe section holding means C' does not require clamping jaws as hereinbefore described. Instead, the inside frame B' is simply provided on its outer end with a yoke 94 bridging the longitudinally extending, laterally spaced bar portions 12. The yoke provides a bearing surface against which the flange 92 is seated, the yoke being open at the bottom to allow the coupling device to be positioned over the pipe section $P^2$. The operation of the device illustrated in FIGS. 6 and 7 is identical with the operation of the device as hereinbefore described in connection with the embodiment illustrated in FIGS. 1-5.

While the coupling devices of the invention are particularly suited to join sections of pipe made of glass fibers coated and embedded in a thermosetting resin, such as an epoxy resin or a polyester resin with a thermosetting resin cement, the devices of the invention may also be used for connecting or joining pipe sections of other materials, for example, pipe made of metal.

It is believed that the advantages and improved results furnished by the pipe coupling devices of the invention will be apparent from the illustration and description of the preferred embodiments thereof. Various changes and modifications may be made without departing from the spirit and scope of the invention as sought to be defined in the following claims.

We claim:

1. A pipe coupling device comprising an outside frame having laterally spaced, longitudinally extending bar portions, an inside frame having laterally spaced, longitudinally extending bar portions positioned adjacent to and inwardly of the outside frame bar portions, the inside frame bar portions being spaced apart a distance to allow pipe to extend longitudinally therebetween, means provided by the bar portions of one frame cooperable with the bar portions of the other frame to maintain the frames in parallel, telescopic alignment, means associated with each frame for holding a pipe section, a pair of tension springs, each tension spring having one end connected to the inner end of each bar portion of one frame and its opposite end connected to the other frame, and manually operable means to place the springs in tension.

2. A pipe coupling device according to claim 1, wherein the manually operable means to place the springs in tension comprises a bifurcated lever having laterally spaced arms respectively pivotally connected to the inner end of each bar portion of the inside frame, each tension spring being connected to each bar portion of the inside frame by a toggle link pivotally connected to each arm.

3. A pipe coupling device according to claim 2, wherein the means associated with each frame for holding a pipe section comprises adjustable clamping jaws.

4. A pipe coupling device according to claim 2, wherein the means associated with each frame for holding a pipe section comprises adjustable clamping jaws mounted on one frame, and a yoke on the other frame to provide a bearing surface for a flanged pipe section.

5. A pipe coupling device according to claim 2, wherein the means provided by the bar portions of one frame cooperable with the bar portions of the other frame to maintain the frames in parallel, telescopic alignment comprises guide rings provided by the outside frame bar portions, the bar portions of the inside frame extending through the guide rings.

6. A pipe coupling device according to claim 2, wherein the inner end of each bar portion of the inside frame has a slot, the ends of the laterally spaced arms of the bifurcated lever being positioned within the slots; wherein the end of each arm has a slot, a portion of each toggle link being positioned in each arm slot; and wherein the outside frame has laterally spaced web portions at the outer end thereof, the tension springs being respectively connected to the web portions.

7. A pipe coupling device according to claim 6, wherein the means associated with each frame for holding a pipe section comprises adjustable clamping jaws.

8. A pipe coupling device according to claim 6, wherein the means associated with each frame for holding a pipe section comprises adjustable clamping jaws mounted on one frame, and a yoke on the other frame to provide a bearing surface for a flanged pipe section.

9. A pipe coupling device according to claim 6, wherein the means provided by the bar portions of one frame cooperable with the bar portions of the other frame to maintain the frames in parallel, telescopic alignment comprises guide rings provided by the outside frame bar portions, the bar portions of the inside frame extending through the guide rings.

* * * * *